(12) United States Patent
Chandra et al.

(10) Patent No.: US 10,147,063 B2
(45) Date of Patent: Dec. 4, 2018

(54) TRANSFORMING PROJECT MANAGEMENT REPRESENTATIONS INTO BUSINESS PROCESS REPRESENTATIONS

(75) Inventors: Anca A. Chandra, San Jose, CA (US); Vikas Krishna, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 303 days.

(21) Appl. No.: 13/550,273

(22) Filed: Jul. 16, 2012

(65) Prior Publication Data
US 2014/0019370 A1    Jan. 16, 2014

(51) Int. Cl.
*G06Q 10/06* (2012.01)

(52) U.S. Cl.
CPC .............................. *G06Q 10/06313* (2013.01)

(58) Field of Classification Search
CPC .................................................. G06Q 10/067
See application file for complete search history.

(56) References Cited

U.S. PATENT DOCUMENTS

| 7,350,184 | B2 | 3/2008 | Upton |
| 7,506,302 | B2 | 3/2009 | Bahrami |
| 2003/0172368 | A1 | 9/2003 | Alumbaugh et al. |
| 2006/0184412 | A1 | 8/2006 | Kagan et al. |
| 2007/0005618 | A1* | 1/2007 | Ivanov et al. ................ 707/100 |
| 2007/0073738 | A1 | 3/2007 | Fredrickson et al. |
| 2009/0083087 | A1* | 3/2009 | Wolter et al. .................... 705/7 |
| 2009/0265684 | A1* | 10/2009 | Fuchs ....................... G06F 8/10 717/105 |
| 2011/0071869 | A1* | 3/2011 | O'Brien et al. ................ 705/7 |
| 2013/0104099 | A1* | 4/2013 | Gores et al. ................ 717/104 |
| 2013/0246105 | A1* | 9/2013 | Winkler .............. G06Q 10/067 705/7.11 |
| 2014/0012856 | A1* | 1/2014 | Abdelrahman .... G06Q 30/0621 707/740 |

OTHER PUBLICATIONS

Schnurbusch, Buffy, "Driving Business Efficiency: The Fusion of Business Process and Project Management", online article, Jun. 2010, 6 pages, vol. XII, Issue VI, PM World Today, available at http://www.pmforum.org/library/tips/2010/PDFs/june/Advisory-Schnurbusch.pdfeJournal as of Jan. 14, 2011.

"Effective Planning and Reporting", White Paper, Jun. 2008, 6 pages, Virtify, Inc., Cambridge, Massachusetts, available at http://www.virtify.com/knowledge-center/ as of Jan. 14, 2011.

(Continued)

*Primary Examiner* — Maria C Santos-Diaz
(74) *Attorney, Agent, or Firm* — Ference & Associates LLC

(57) ABSTRACT

Systems and methods for are described herein for transforming project management application representations into business process models. An aspect provides for receiving at least one portion of a project management application representation; and generating at least one business process by applying at least one transformation pattern to the at least one project management representation. Other embodiments and aspects are also provided herein.

13 Claims, 15 Drawing Sheets

(56) References Cited

OTHER PUBLICATIONS

"Phase F: Migration Planning", Part II Architecture Development Method (ADM), online document, 6 pages, available at http://pubs.opengroup.org/architecture/togaf8-doc/arch/ as of Mar. 23, 2011.

"Data Conversion Plan", online document, 15 pages, available at http://www2.cdc.gov/cdcup/library/hhs_eplc/30%20-%20Data%20Conversion/EPLC_Data_Conversion_Plan_Template.doc, as of Feb. 24, 2011.

"Leading Transformational Change with Business Process Improvement", online book, Version 1.0, 2009, 4 pages, available at www.managementeffect.com/getfile.php?f=cicms/assets/pdfs/...v.pdf as of Jan. 14, 2011.

\* cited by examiner

Resources Defined in Microsoft Project

```
<Resource>
  <UID>0</UID>
  <ID>0</ID>
  <Name>Project Manager</Name>
  <Cost>1</Cost>
</Resource>
```

Resources Defined in WBM

```
<wbim:resourceModel>
  <wbim:roles>
    <wbim:role name="Prsn132i##Project Manager">
      <wbim:costPerTimeUnit timeUnit="PT1H">
        <wbim:costValue currency="USD">1</wbim:costValue>
      </wbim:costPerTimeUnit>
    </wbim:role>
  </wbim:roles>
</wbim:resourceModel>
```

FIG. 2

Tasks Defined in Microsoft Project

```
<Task>
  <UID>3093</UID>
  <ID>1</ID>
  <Name>Task 1</Name>
  <OutlineNumber>1</OutlineNumber>
  <OutlineLevel>1</OutlineLevel>
  <Duration>PT0H0M0S</Duration>
  <Cost>800.50</Cost>
  <ActualDuration>PT9H10M0S</ActualDuration>
```

Tasks Defined in WBM

```
<wbim:task name="Task 1">
  <wbim:inputs>
    <wbim:input name="Input3083"/>
  </wbim:inputs>
<wbim:outputs>
  <wbim:output name="Output3083"/>
</wbim:outputCriterion>
<wbim:outputs>
<wbim:operationalData>
  <wbim:timeEstimation>
    <wbim:processingTime>
      <wbim:literalValue>P0Y0M0DT9H10M0S</wbim:literalValue>
    </wbim:processingTime>
  </wbim:timeEstimation>
  <wbim:cost>
    <wbim:executionCost currency="USD">
      <wbim:literalValue>800.50</wbim:literalValue>
    </wbim:executionCost>
  </wbim:cost>
</wbim:operationalData>
</wbim:task>
```

FIG. 3

| Connections Defined in Microsoft Project |
|---|
| `<PredecessorLink>`<br>  `<PredecessorUID>2088</PredecessorUID>`<br>`</PredecessorLink>` |
| Connections Defined in WBM |
| `<wbim:connection name="Connection_join_2877">`<br>  `<wbim:source contactPoint="Output_2877" node="Task 3"/>`<br>  `<wbim:target contactPoint="Input2877" node="Task 4"/>`<br>`</wbim:connection>` |

FIG. 4

```
Define root_list and end_list
Add all nodes to the root_list
For every node in root_list
    Find all successors of the node
    For every successor
        Remove node from end_list (if there)
        Remove seccessor from root_list (if
        there)
        Create link from node to successor
        Add successor to end_list
If root_list. size > 1
    Add split node
    Connect input of sub-process to input of
    split node
    Connect outputs of split node to inputs of
    nodes from root_list
Else
    Connect input of sub-process to input of
    node in root_list
If end_list. size > 1
    Add merge node
    Connect output of merge node to output of
    sub-process
    Connect outputs of nodes in end_list to
    inputs of merge node
Else
    Connect output of node in end_list to
    output of sub-process
```

FIG. 7

| | Task Name | Duration | Start | Finish | Predecessors |
|---|---|---|---|---|---|
| 1 | -Task1 ~804A | 2 days? | Wed 6/9/10 | Wed 6/10/10 | |
| 2 | Dependent1 ~805A | 1 day? | Wed 6/9/10 | Wed 6/9/10 | |
| 3 | Dependent2 ~806A | 1 day? | Wed 6/10/10 | Wed 6/10/10 | 2 |
| 4 | Dependent3 | 1 day? | Wed 6/9/10 | Wed 6/9/10 | |
| 5 | -Task2 ~803A ~807A | 2 days? | Wed 6/10/10 | Wed 6/11/10 | |
| 6 | Dependent4 ~808A | 1 day? | Wed 6/10/10 | Wed 6/10/10 | 4 |
| 7 | Dependent5 | 1 day? | Wed 6/11/10 | Wed 6/11/10 | 6 |

FIG. 8A

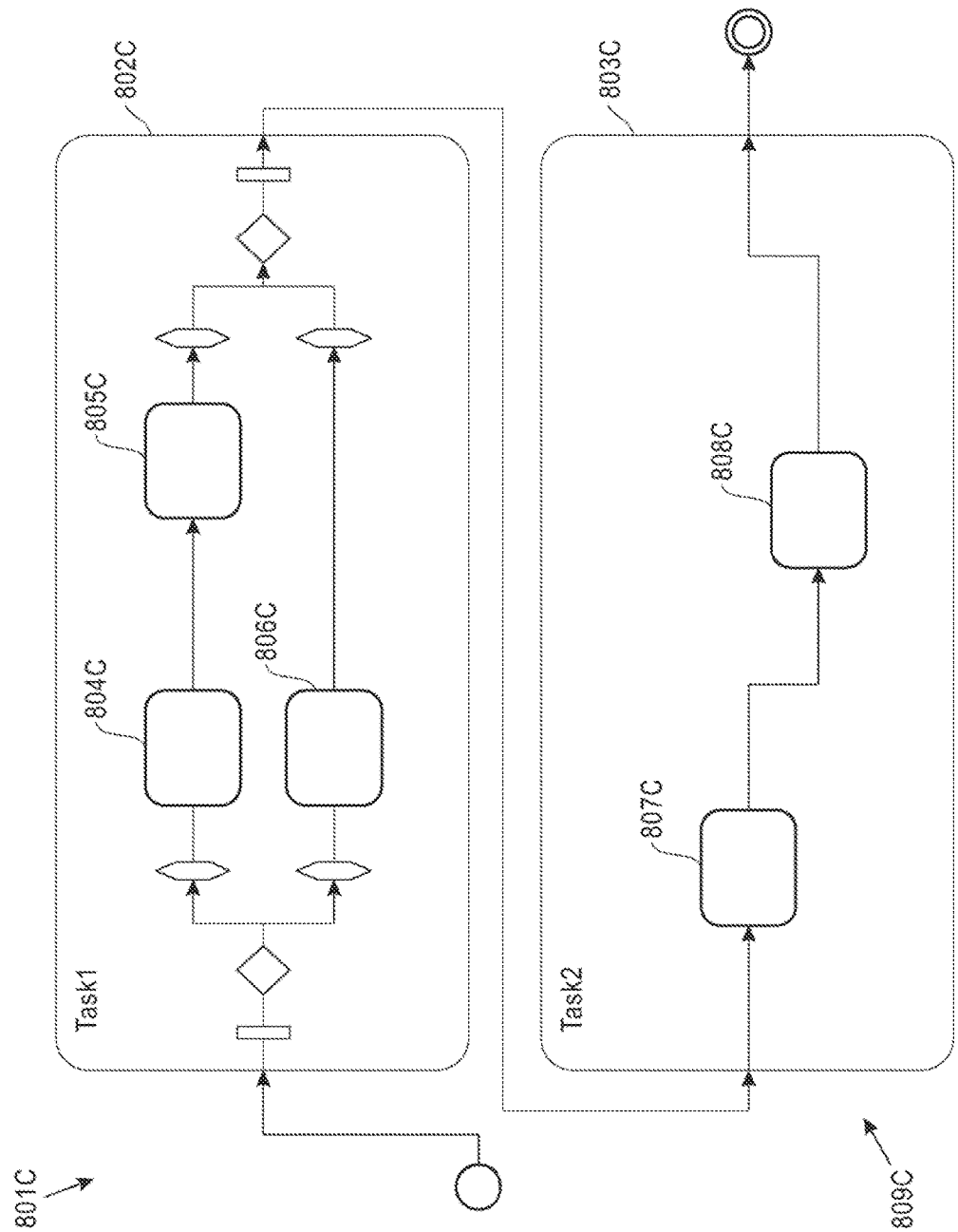

TRANSFORMING PROJECT MANAGEMENT REPRESENTATIONS INTO BUSINESS PROCESS REPRESENTATIONS

BACKGROUND

Many organizations have standardized the way that projects are defined and delivered. One popular method is the project management representation, such as a project plan, which is an instrument designed to guide project implementation, management, and control. On a basic level, a project plan may be comprised of a series of project activities distributed along a timeline. Multiple elements may also be incorporated to enhance the usefulness of a project plan, including activity relationships, milestones, resources, and objectives. Another prominent approach is business process modeling (BPM), which involves graphically representing the processes designed by an enterprise to produce a product or provide a service. BPM may be used to analyze, compare, and improve the processes depicted within the model. Both project planning and BPM have a rich set of functions, provided through different notations and program structures, for modeling and planning business projects.

BRIEF SUMMARY

In summary, one aspect provides a system for generating a business process model from a project management application representation comprising: at least one processor; a system memory operatively coupled to the at least one processor, the system memory to store program instructions accessible to the at least one processor; and wherein, responsive to execution of program instructions accessible to the at least one processor, the at least one processor is configured to: receive at least one portion of a project management application representation; and generate at least one business process model by applying at least one transformation pattern to the at least one portion of a project management application representation.

Another aspect provides a method for generating a business process model from a project management application representation comprising: receiving at least one portion of a project management application representation; and generating at least one business process model by applying at least one transformation pattern to the at least one portion of a project management application representation.

A further aspect provides a computer program product for generating a business process model from a project management application representation comprising: a computer readable storage medium having computer readable program code embodied therewith, the computer readable program code comprising: computer readable program code configured to receive at least one portion of a project management application representation; and computer readable program code configured to generate at least one business process model by applying at least one transformation pattern to the at least one portion of a project management application representation.

The foregoing is a summary and thus may contain simplifications, generalizations, and omissions of detail; consequently, those skilled in the art will appreciate that the summary is illustrative only and is not intended to be in any way limiting. For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 2 provides a table depicting an example transformation of project plan resources into business process model roles.

FIG. 3 provides a table illustrating an example transformation of project plan tasks into a business process model.

FIG. 4 provides a table illustrating an example transformation of a project plan connection into a business process model connection.

FIG. 7 provides an example process for creating a business process model dependent structure.

FIGS. 8A-8C provide an example transformation of a project plan into a corresponding business process model.

DETAILED DESCRIPTION

Figure 1:
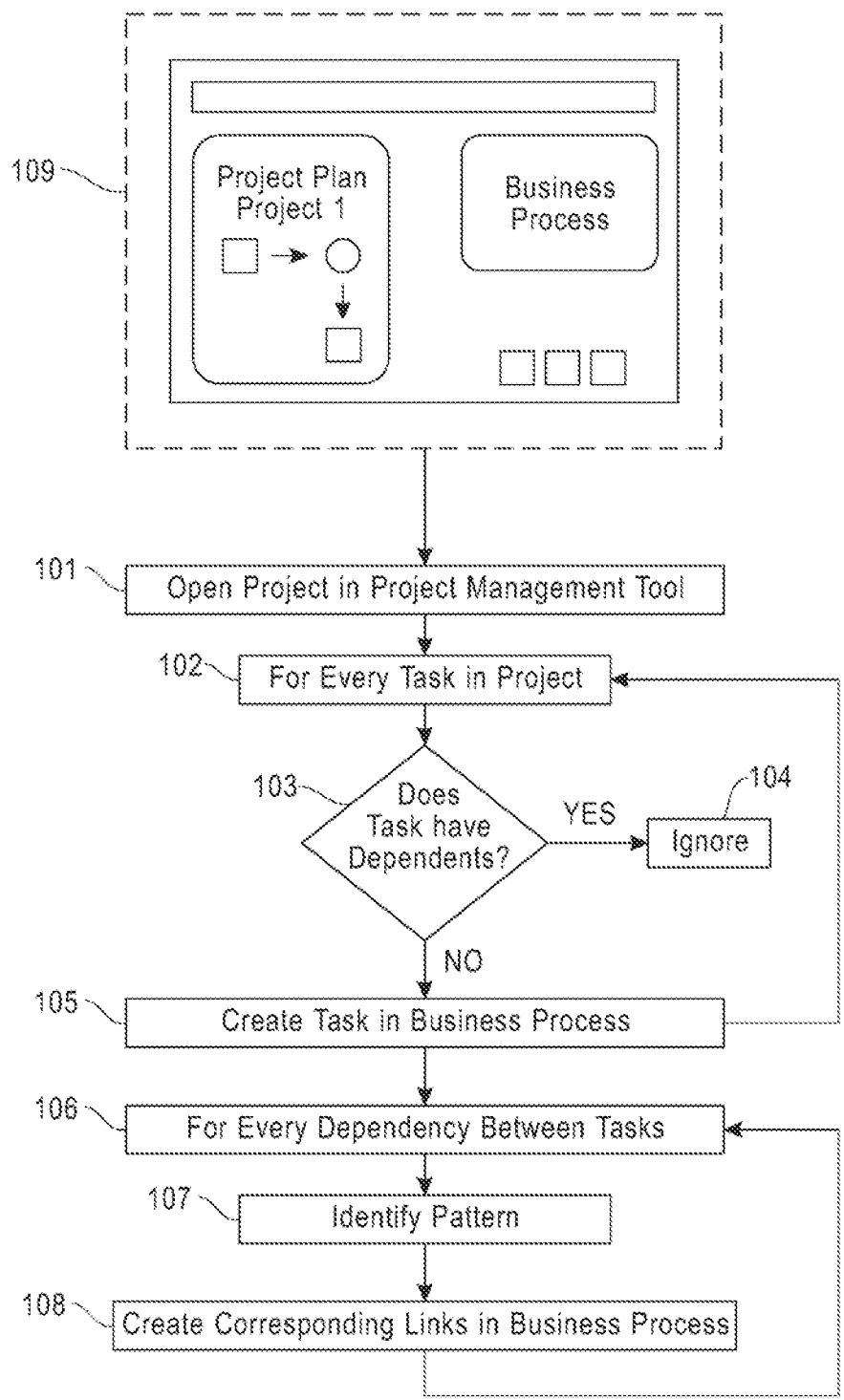
FIG. 1 provides a high-level example of transforming a project plan into a business process model.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of certain example embodiments.

Reference throughout this specification to an "embodiment" or "embodiment(s)" means that a particular feature, structure, or characteristic described in connection with the embodiment is included in at least one embodiment. Thus, the appearances of "embodiment" or "embodiment(s)" in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid prolixity.

Current technology provides project management tools for developing project management representations that describe managed engagements in great detail, including building plans with schedules, baselines, milestones, and resources. Exemplary project management applications are Microsoft® Project (e.g., Microsoft® Project 2003) and Basecamp®. Microsoft is a registered trademark of the Microsoft Corporation. Basecamp is a registered trademark of 37signals, LLC. These tools provide for a limited analysis of project plans, such as discovering critical paths, cycles, resource retention, and determining whether a particular task will actually be completed. However, existing project planning methods have multiple shortcomings, particularly in that they do not provide for verification of whether an engagement will actually be successful even if the project plan is followed as designed.

For example, current project plan methods only allow for analysis of individual project plans and not for examination of multiple project plans which may rely on each other. To illustrate, one project plan may be created for constructing a building that includes a high-level wiring task, while another project plan may be created for the actual wiring task. The building project plan depends on the wiring task project plan. However, because current methods do not provide for analyzing relationships between project plans, dependencies between these two project plans may not be realized or fully analyzed. In addition, existing technology is not able to fully examine dependencies, such as process bottlenecks that may significantly impact the project plan. Furthermore, existing project management tools only allow for static analysis of project plans, providing little or no support for performing simulations or dynamic analysis, such as identifying the timing and allocation of project resources.

There are a large number of tools specialized in business process simulation, such as business process modeling applications including the International Business Machines Corporation (IBM) WebSphere® Business Modeler (WBM). WebSphere is a registered trademark of International Business Machines Corporation. Implementing a project plan as a business process would allow for the implementation of dynamic operations, such as simulations, on project plans. However, this is an extremely difficult and costly endeavor because, inter alia, project engagements are often extremely complex, involving multiple tasks, schedules, resources, costs, inputs and outputs, and dependencies. For example, a typical engagement may have 80-100 components, each with 300-400 tasks. Existing technology does not provide a solution for representing a project plan as a business process without requiring specialized tools and time consuming manual translation from one format to the other. As such, existing methods are time consuming, require specialized knowledge, and involve expensive software solutions, each of which adds significantly to the costs and scheduling pressures of a given project.

In recent years, a large number of enterprises have moved from focusing on IT infrastructure to strategically undergoing business transformations. Exemplary transformations include enterprise-wide organizational restructuring, corporate transactions, cross-functional performance improvements, enterprise-wide IT projects, value chain optimization, and other related strategic changes.

From the moment a request for proposal is issued until the project is delivered, such business transformation projects are extremely complex in both required resources and completed tasks. In a general example, after the sales team of a business transformation service provider wins a request for proposals and secures a project deal, the sales team may transition the project to the delivery team. One goal of the transition is to enable the delivery work to commence from the premises and/or the resources of the service providing organization. In an effort to minimize the delivery costs and time involved, services companies are standardizing the way projects are defined and delivered. These plans are essentially based on practitioners' expertise and are not actually tested in the field. However, it is very difficult to verify whether these standard best-practices will be successful before employing them in real engagements due to the vagaries of every unique engagement. As such, it would be highly beneficial if such transformations could be simulated before being applied within an organization or in the marketplace.

Manual analysis of project plans created for real-world engagements is extremely difficult and practical methods for dynamic analysis are essentially unavailable. In addition, converting a project plan into a business process according to existing technology is not a practical endeavor because, inter alia, the conversion is not obvious because of certain important differences between project plans and business process representations. For example, business process models represented through Business Process Modeling Notation (BPMN) (e.g., BPMN version 1.2) define certain restrictions on the structure of a business process that conflict with the freedom of defining a project plan. In addition, there is not a one-to-one relationship between elements and relationships comprising a project plan and the elements and relationships that make up a business process. On a certain level, project plans representations comprise freedom in the planning process, while business process representations comprise restrictions. To illustrate, in a project plan, such as a project plan configured utilizing a project management application, project managers may link any two tasks through a dependency, while in BPMN, business process owners may only connect two tasks that belong to the same parent and are on the same level. This difference represents merely one of many characteristics that separate representing project engagements through project plans and through business processes.

Embodiments provide for transforming project management application representations (e.g., project plans) into business process models. According to embodiments, business process models generated from project management application representations may be loaded and simulated using standard business process management tools, such as tools that support BPMN. An illustrative and non-restrictive example of a project management application representation is a plan represented using XML, for example, using Microsoft® Project. Non-limiting examples of business process models are processes represented using BPMN or in XML through IBM WebSphere® Business Modeler (WBM).

A transformation system according to embodiments may perform transformation using one or more transformation patterns, including, but not limited to, task and dependency transformation patterns. A task transformation pattern according to an embodiment may be comprised of transforming project plan leaf tasks into corresponding business plan activities, wherein all "leaf" nodes in the project plan have both an input and an output in the corresponding business process model. As used herein, "leaf" refers to objects, such as nodes, activities, or tasks that do not have any objects depending off of it. In addition, the term "dependent," and variations thereof, refers to objects with a dependency, such as an object in a parent-dependent relationship.

According to embodiments, dependency transformations may be configured to resolve leaf node versus internal node dependencies, as well as dependencies among siblings, "cross-generations," and "cross-families." A non-limiting example of a cross-generation dependency is a dependency between a dependant node and a related grand-dependent node, while non-limiting examples of cross-family dependencies are dependencies between dependent or grand-dependent nodes that do not have a common parent or grandparent. A transformation system according to embodiments disclosed herein may manually or automatically apply transformation patterns to transform project management application representations into business process models.

According to a hierarchical transformation embodiment, a project management application representation hierarchy may be transformed by creating a business process model with a similar structure. As a non-limiting example, the hierarchical transformation embodiment may represent a project management application representation leaf task as an atomic activity in a corresponding business process model. In addition, the hierarchical transformation embodiment may transform a project management application representation task that has dependent tasks into a sub-process containing activities that correspond to the dependent tasks.

A flat transformation embodiment excludes the hierarchical nature of project management application representations during transformation and provides a corresponding "flat" business process representation. The flat transformation embodiment may receive a project management application representation as input and produce a business process model, wherein every project management application representation element, including, but not limited to, tasks, resources, costs, and schedules, may be transformed recursively into a corresponding business process model element, such as, activities, resources, costs, or timelines.

Referring to FIG. 1, therein is provided a high-level example of transforming a project management application representation into a business process model according to an embodiment. The transformation system 109 accesses the project management application representation using an appropriate project management tool 101. Each task in the project management application representation is accessed 102 by the transformation system 109 and the transformation system 109 determines whether each task has dependents 103. If a task has one or more dependents, it is ignored 104; otherwise, a corresponding task is created in the business process model 105. Each task transformed into a corresponding business process model is analyzed to determine dependencies 106. For every dependency between tasks 106, the pattern is identified 107 and a corresponding link is created in the resultant business process model 108.

Exemplary transformation case studies are now presented herein to further describe certain embodiments. The case studies are not intended to limit the scope of embodiments or aspects of embodiments described herein or as claimed, but merely serve to illustrate exemplary embodiments. More specifically, the transformation case studies consist of a hierarchical transformation case study and a flat transformation case study. The transformation case studies used project management application representations defined in XML through a project management application and generate business process models defined in XML through a business process modeling application.

Several entities required for business process models were taken into consideration during the transformation case studies. These entities consisted of at least the following: the structure of the business process model, as defined by the tasks and connections between tasks; the resources executing the tasks and their association to the tasks; the resources availability as given by certain calendars; the costs associated with tasks and resources; and timelines as defined by tasks.

The following non-limiting examples illustrate the mapping between tags defined by a project management application representation XML and the tags defined by a business process model according to embodiments and as utilized in the transformation case studies. In a typical project management application, either people or software/hardware can execute tasks. For each type of resource, there is a different set of attributes defined. For example, a business object may have ID, unique ID (UID), name, and cost attributes. In FIG. 2, therein is provided a table depicting a transformation according to an embodiment, wherein project management application representation resources are transformed into corresponding BPMN roles with similar properties. As demonstrated by the table provided in FIG. 2, transformations from project management application representations to business process models are not simple one-to-one assignments of elements.

A project management application may provide for only one type of task and organize multiple tasks into a hierarchical structure. However, business process modeling applications may operate to distinguish between tasks that have dependents and leaf tasks. In the transformation case studies, project management application representation tasks that have dependents are transformed according to embodiments to become business process sub-processes. For example, in a business process modeling application, sub-processes may be defined as a set of nodes connected through links. Nodes may be atomic activities, sub-processes, and functional nodes, which may be split or merge nodes. FIG. 3 provides a table illustrating the transformation of project management application representation tasks into a business process model in the transformation case studies configured according to an embodiment. As shown in FIG. 3, the transformation case studies transformed project management application representation tasks with no dependents into atomic activities in the business process modeling application model. In addition to the project management application representation task properties, embodiments provide that the transformation process may define one input and one output for each task. The inputs and outputs are necessary to define connections within a business process model.

Relationships between tasks may only be saved in a project management application as a "predecessor" property on one of the tasks. Referring to FIG. 4, therein is depicted a table illustrating the transformation of a project management application representation connection into a business process model connection in the transformation case studies configured according to an embodiment. As demonstrated by the table of FIG. 4, in a business process modeling application, a connection may be defined as a directed link between the output of a predecessor task and the input of a successor task.

The following is a description of a hierarchical transformation case study configured according to an embodiment. Both project management application representations and business process models enable users to capture workflows through hierarchical structures. As such, embodiments provide for the transformation of a project management application representation hierarchy into a business process model with similar structure.

Figure 5:
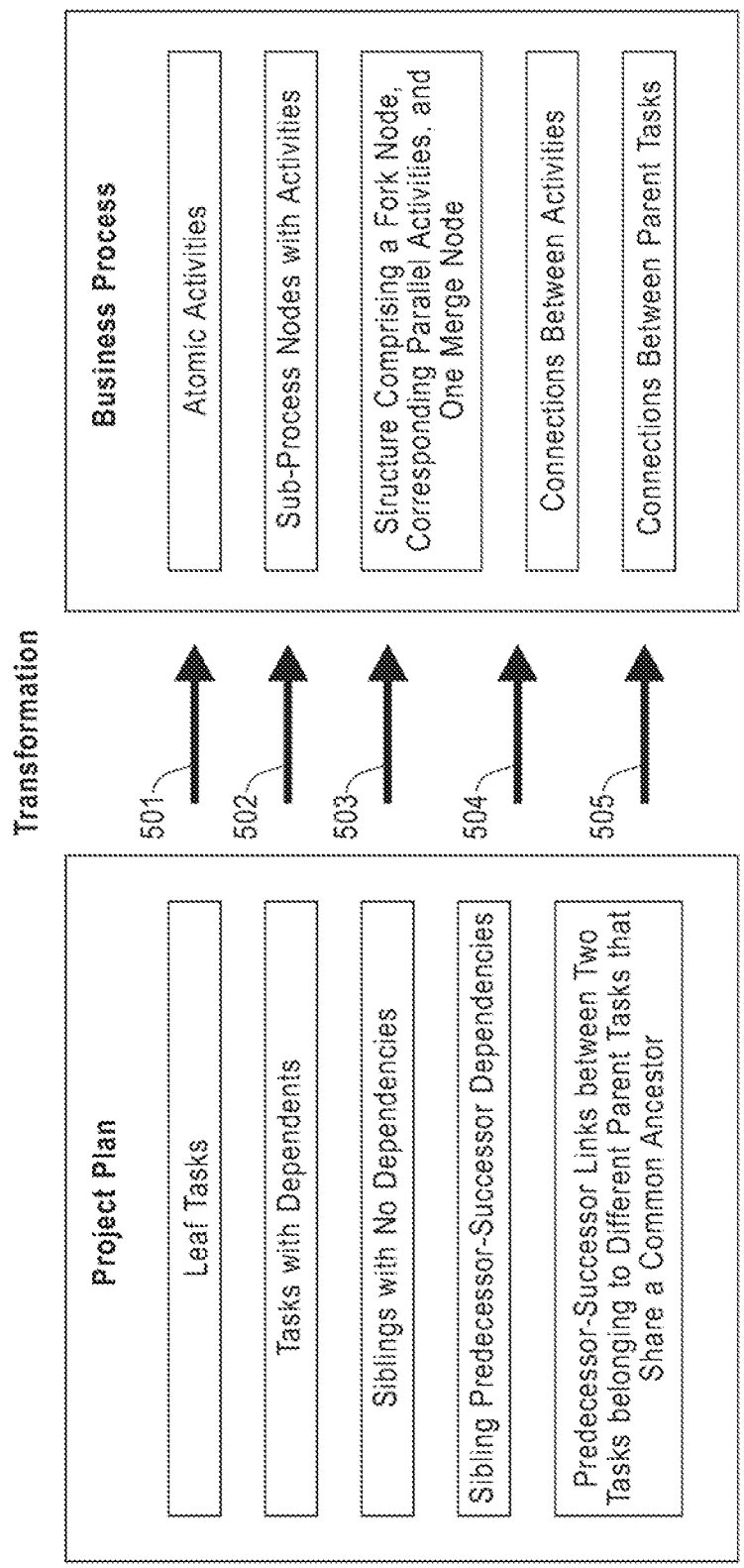
FIG. 5 provides an exemplary transformation process as provided by a hierarchical transformation case study.

FIG. 5 provides an exemplary transformation process as provided by a hierarchical transformation case study configured according to an embodiment. Project management application representation leaf tasks may be transformed into atomic activities each having one input and one output 501. Tasks within the project management application representation that have dependents are transformed into sub-process nodes each containing activities corresponding to the project management application representation dependents tasks 502. Two or more siblings that have no dependencies between them become a combination of one fork node, two or more parallel activities, and one merge node 503. A predecessor-successor dependency between two project management application representation sibling tasks becomes connections between two corresponding business process model activities 504, wherein the output of the predecessor activity is connected to the input of the successor activity. A predecessor-successor link between two project management application representation tasks belonging to different project management application representation parent tasks that share a common ancestor task becomes a connection between the corresponding business process model parent tasks 505. According to embodiments, when the predecessor-successor link between two tasks belonging to different parent tasks with a common ancestor is transformed into a connection between business process model parent tasks 505, the relationship between two activities may be elevated to the level of their parents. As such, all activities under one parent may become predecessors of all activities under the second parent.

Figure 6:
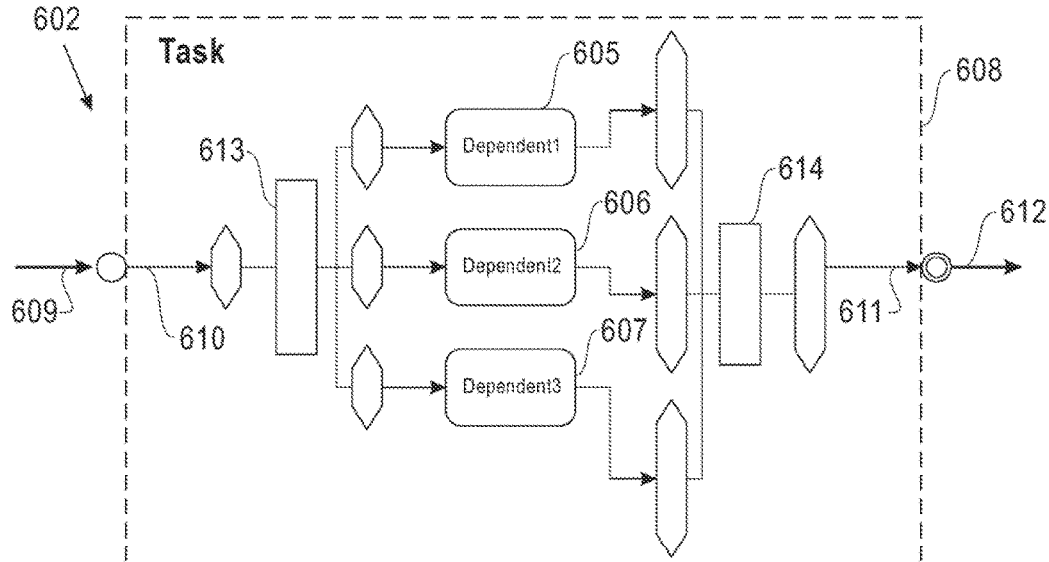
FIG. 6 provides an example transformation of a project plan task with dependents into a corresponding business process model.

Referring to FIG. 6, therein is provided an example transformation of a project management application representation task with dependents into a corresponding business process model. In FIG. 6, a project management application representation 616 is transformed into a corresponding business process model 602 in a hierarchical transformation case study configured according to an embodiment. The task "Task" 601 has the following three dependents: dependent 1 602, dependent 2 603, and dependent 3 604. The dependents 602, 603, 604 are transformed according to embodiments into atomic activities 605, 606, 607 of a sub-process named "Task" 608. The sub-process input 609 is connected to the input of the root of the business process model dependents structure 610. In addition, the sub-process output 611 is connected to the output of the end of the business process model dependent structure 612.

According to embodiments, two or more siblings (i.e., dependent 1 602, dependent 2 603, and dependent 3 604) without dependencies between them are configured according to embodiments as a combination of one fork node 613, two or more parallel activities 602, 603, 604, and one merge node 614. In FIG. 7, therein is provided an illustrative and non-restrictive process for creating the dependent structure depicted in FIG. 6.

Figure 8B:
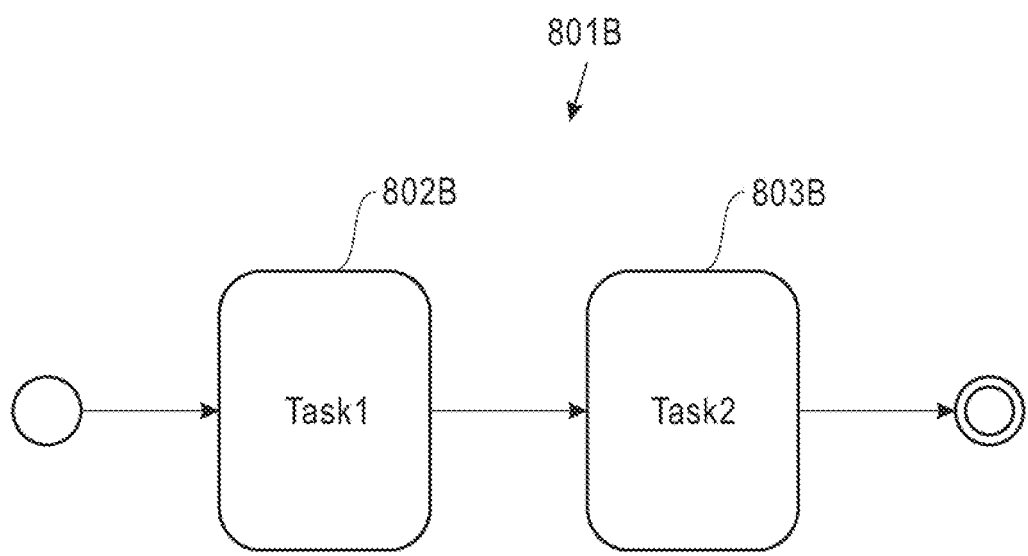

Referring to FIGS. 8A-8C, therein is depicted an example transformation of a project management application representation into a corresponding business process model, wherein the project management application representation is comprised of multiple tasks each having multiple dependents. In FIGS. 8A-8C, a project management application representation 801A is transformed into a corresponding business process model 801B, 801C in the hierarchical transformation case study configured according to an embodiment. FIG. 8A provides an exemplary process plan 801A comprised of parent tasks Task1 802A and Task2 803A. Task1 802A has dependents tasks dependent1 804A, dependent2 805A, and dependent3 806A, while Task2 803A has dependents tasks dependent4 807A and dependent5 808A. FIG. 8B provides a high level diagram of a business process model 801B resulting from the transformation of the project management application representation 801A of FIG. 8A. The business process model 801B of FIG. 8B is comprised of a Task1 sub-process 802B and a Task2 sub-process 803B.

Referring to FIG. 8C, therein is depicted a more detailed view of the high-level business process model of FIG. 8B. In FIG. 8C, a business process model 801C is provided comprised of a Task1 sub-process 802C and a Task2 sub-process 803C. Dependent1 804C, dependent2 805C, and dependent3 806C activities are depicted within the Task1 sub-process 802C, while dependent4 807C and dependent5 808C activities are depicted within the Task2 sub-process 803C.

Project management application representation Task1 802A and Task2 803A have a predecessor-successor dependency between them, wherein Task1 802A is a predecessor of Task2 803A, its successor. Task1 802A and Task2 803A are transformed into sub-processes Task1 802B and Task2 803B in the resultant business process model 801B provided in FIG. 8B. Due to the predecessor-successor link between project management application representation Task1 802A and Task2 803A, the output 804B of predecessor Task1 802B is connected to the input 805B of successor Task2 803B during transformation.

According to embodiments, a project management application representation predecessor-successor link between two tasks that belong to different parent tasks that share the same ancestor task become a connection between the parent tasks in the resultant business process model. As provided in FIG. 8A, dependent3 806A is the predecessor of dependent4 807A. These two tasks 806A, 807A have different parent tasks: the parent of dependent3 806A is Task1 802A and the parent of dependent4 807A is Task2 803A. However, business processes, such as those represented through BPMN, do not allow two activities to have a connection across sub-processes. As such, embodiments elevate the predecessor relationship to the level of the parents (or recursively going up the chain until the parents are siblings). Thus, as illustrated in FIG. 8C, a connection 809C is built between the Task1 sub-process 802C and the Task2 sub-process 803C as though the Task1 sub-process 802C is the predecessor of the Task2 sub-process 803C.

The following provides a description of a flat transformation case study configured according to an embodiment. In this transformation case study, the input of the transformations was a hierarchy project management application representation represented as an XML project management application model, and the output of the transformation was a completely flat business process model represented as an XML business process modeling application model where all tasks were atomic. According to embodiments, every task, resource, cost, and schedule in the project management application representation was transformed recursively into a corresponding business process model activity, resource, cost, or timeline according to BPMN. The transformation patterns utilized within the flat transformation case study may be extended to support certain annotations in a particular project management application, such as Microsoft® Project, including communications between multiple project management application representations. The following four transformation patterns, configured according to embodiments, were used within the flat transformation case study: Siblings With No Dependencies; Siblings With Dependencies; Cross Generations; and Cross Families.

Figure 9:
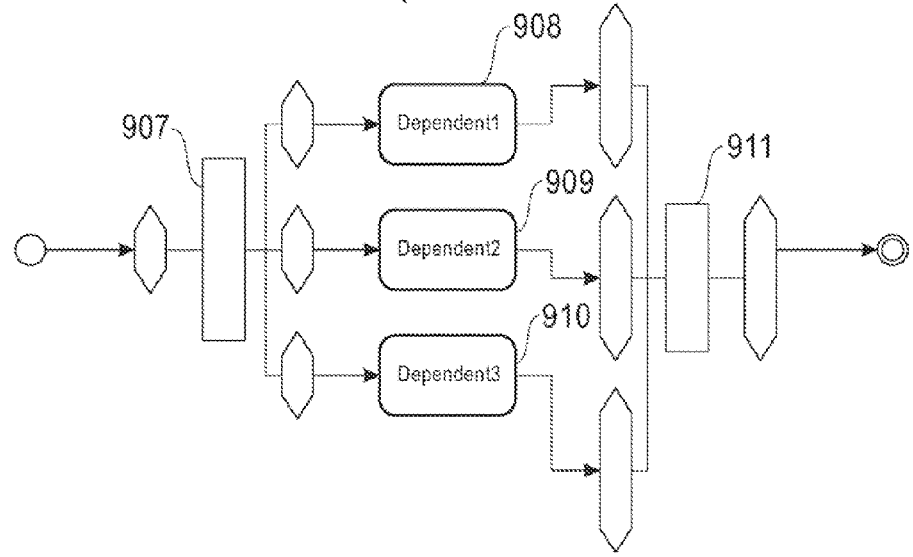
FIG. 9 provides an example flat transformation of a project plan into a business process model using the Siblings with No Dependencies pattern.

Referring to FIG. 9, therein is depicted an example flat transformation of a project management application representation into a business process model configured according to an embodiment, wherein the transformation involved a Siblings With No Dependencies pattern. A project management application representation 901 consists of a parent task Task 902 having three dependents tasks dependent1 903, dependent2 904, and dependent3 905. The project management application representation 901 is transformed according to embodiments into a business plan 906 consisting of one fork node 907, activity nodes 908, 909, 910 corresponding to project management application representation tasks dependent1 903, dependent2 904, and dependent3 905, and a merge node 911. Embodiments provide that if two or more tasks share the same parent task, these tasks are represented in the corresponding business process model as one fork node followed by parallel activity nodes (one for each leaf task) and one merge node. As such, embodiments may maintain the semantics of "no dependency" between tasks in a project management application representation.

Figure 10:
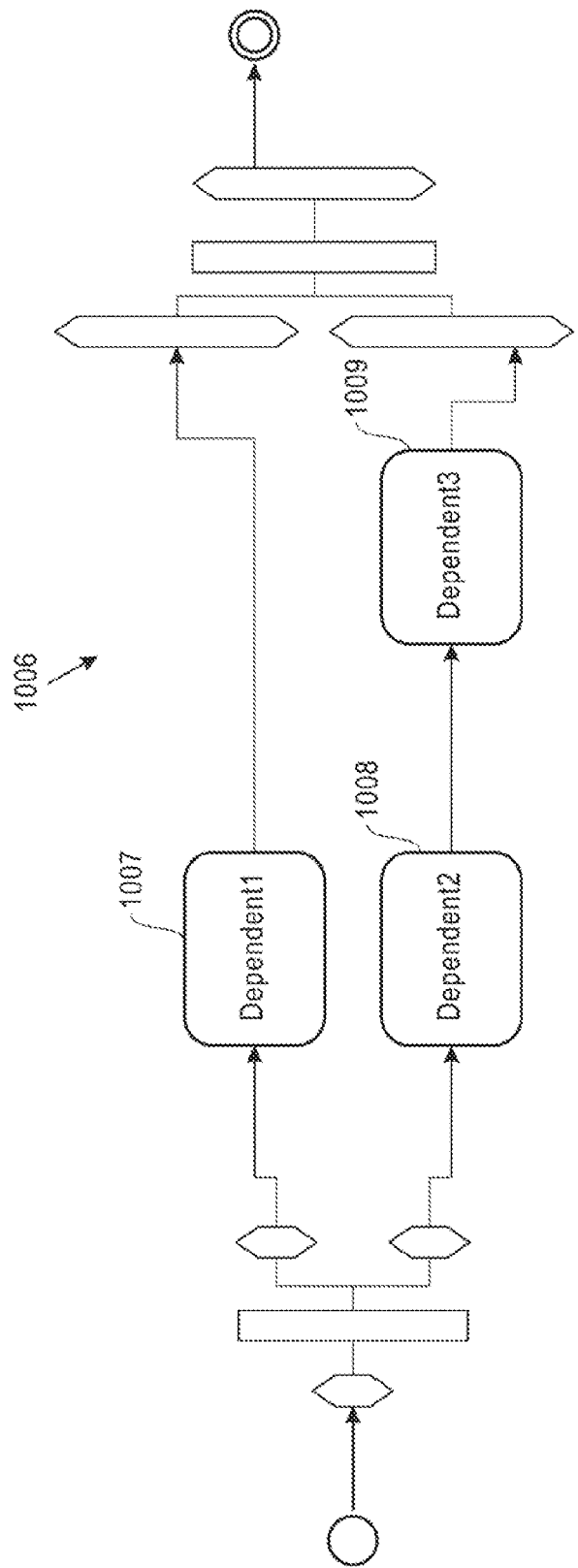
FIG. 10 provides an example flat transformation of a project plan into a business process model using the Siblings with Dependencies pattern.

For the Siblings With Dependencies pattern, embodiments provide that if two siblings have a dependency defined within the project management application representation, a transformation may maintain the sequential relationship by connecting the output of the predecessor to the input of the successor. Referring to FIG. 10, therein is provided an example flat transformation of a project management application representation into a business process model according to an embodiment. A project management application representation 1001 is comprised of a parent task Task 1002 with three dependents, dependent1 1003, dependent2 1004, and dependent3 1005. Dependent2 1004 is the predecessor for dependent3 1005. FIG. 10 also depicts the business process model 1006 resulting from the flat transformation of the project management application representation 1001 according to an embodiment, which consists of dependent1 1007, dependent2 1008, and dependent3 1009 activities. The output of the dependent2 1008 activity is connected to the input of the dependent3 activity 1009 because dependent2 1004 was the predecessor for dependent3 1005 in the source project management application representation 1001.

Figure 11:
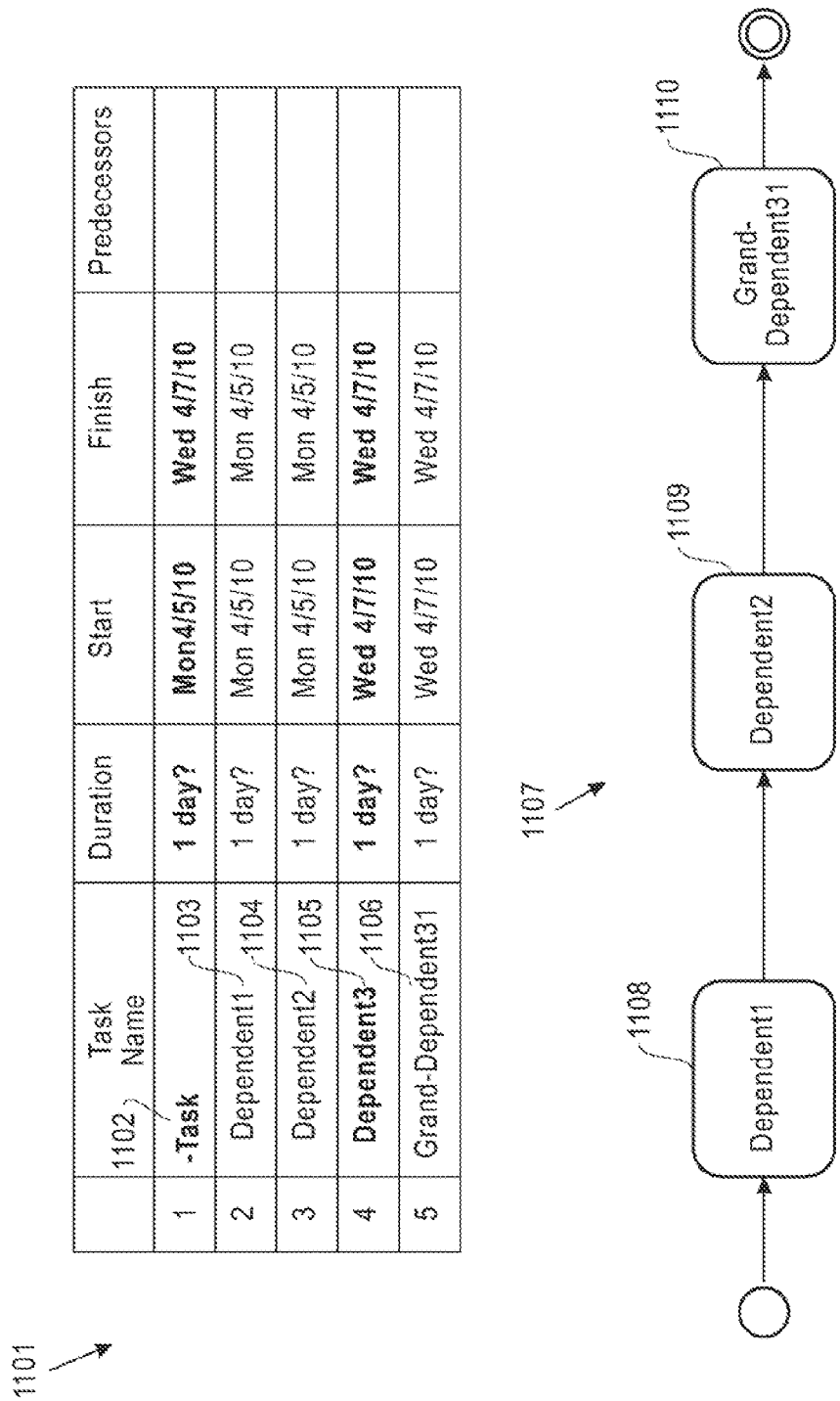
FIG. 11 provides an example flat transformation of a project plan into a business process model using the Cross Generations pattern.

According to embodiments, for Cross Generation project management application representation configurations, if one task is the predecessor of another task that has dependents leaf tasks, a flat transformation may eliminate the task with dependents. Embodiments provide that the transformation may elevate the dependents to the level of their parents and duplicate predecessor relationships for all dependents. FIG. 11 illustrates an example flat transformation involving a Cross Generation pattern. A project management application representation 1101 is comprised of a task Task 1102 having dependent1 1103, dependent2 1104, and dependent3 1105 dependents tasks. The dependent3 1105 task has a dependent task, grand-dependent31 1106, which is a grand-dependent of Task 1102. In the example provided in FIG. 11, dependent2 1104 is the predecessor of dependent3 1105, which has one dependent task, grand-dependent31 1106. The flat transformation configured according to embodiments removes dependent3 1105 and sets dependent2 1104 as the predecessor for grand-dependent31 1106. Embodiments provide that the flat transformation for the siblings and dependencies pattern is applied the updated configuration of project management application representation tasks. FIG. 11 illustrates the business process model 1107 resulting from the flat transformation configured according to embodiments, comprised of dependent1 1108, dependent2 1109, and grand-dependent31 1110 activities.

Figure 12:
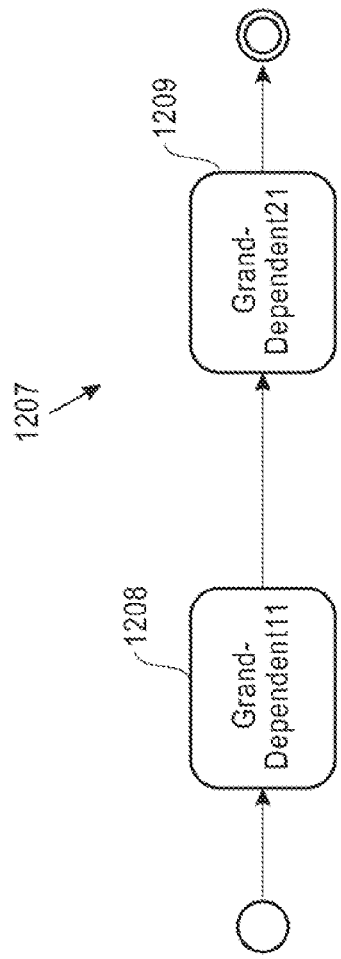
FIG. 12 provides an example flat transformation of a project plan into a business process model using the Cross Families pattern.

Embodiments provide for the Cross Families pattern flat transformation, wherein if a task is the predecessor of another task, and both tasks have leaf dependents, the transformation may remove the original tasks and create a new relationship between the dependents. Referring to FIG. 12, therein is depicted an example flat transformation involving a Cross Families pattern configured according to an embodiment. A project management application representation 1201 is comprised of a task Task 1202 that has two dependents, dependent1 1203 and dependent2 1204, wherein dependent1 1203 is the predecessor of dependent2 1204. Dependent1 1203 has a grand-dependent grand-dependent11 1205, and dependent2 1204 has a grand-dependent grand-dependent21 1206. As illustrated in FIG. 12, the resultant business process model 1207 is comprised of only grand-dependent11 1208 and grand-dependent21 1209 activities corresponding to the grand-dependent11 1205 and grand-dependent21 1206 tasks of the project management application representation 1201.

In order to completely transform one project management application representation into a business process model according to embodiments, the flat transformation process may recursively apply the Siblings With No Dependencies; Siblings With Dependencies; Cross Generations; and Cross Families patterns on all project tasks. As such, embodiments provide that all project management application representation tasks are transformed to exist at the same level within a resultant business process model, such that sub-process restrictions are not applicable.

Figure 13:
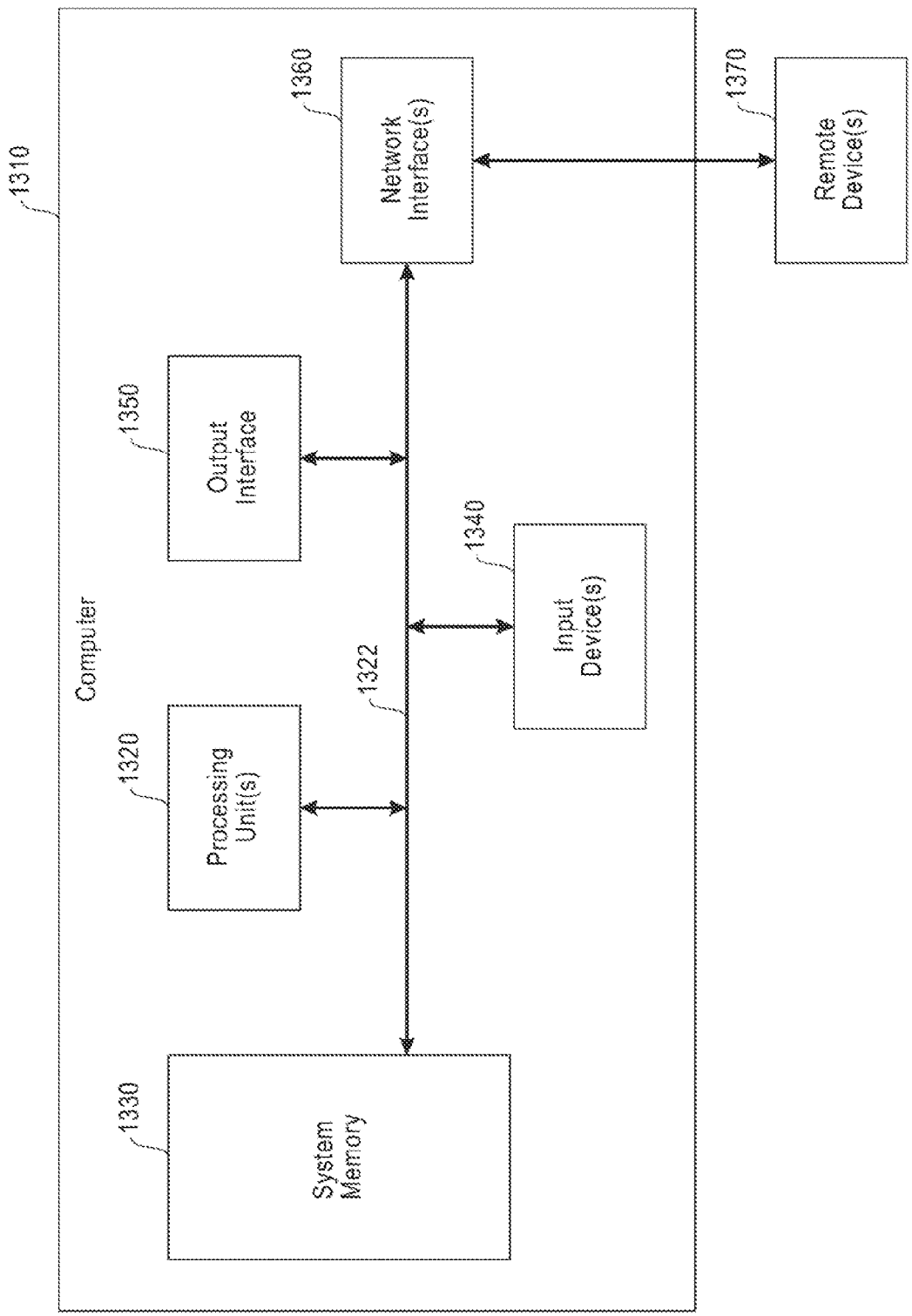
FIG. 13 illustrates an example computer system.

Referring to FIG. 13, it will be readily understood that embodiments may be implemented using any of a wide variety of devices or combinations of devices. An example device that may be used in implementing one or more embodiments includes a computing device in the form of a computer 1310. In this regard, the computer 1310 may execute program instructions; generate at least one information filter comprised of at least one information element; and process at least one source image using the at least one information filter, wherein processing the at least one source image comprises abstracting instances of the at least one information element detected in the at least one source image; and other functionality of the embodiments, as described herein.

Components of computer 1310 may include, but are not limited to, processing units 1320, a system memory 1330, and a system bus 1322 that couples various system components including the system memory 1330 to the processing unit 1320. Computer 1310 may include or have access to a variety of computer readable media. The system memory 1330 may include computer readable storage media in the form of volatile and/or nonvolatile memory such as read only memory (ROM) and/or random access memory (RAM). By way of example, and not limitation, system memory 1330 may also include an operating system, application programs, other program modules, and program data.

A user can interface with (for example, enter commands and information) the computer 1310 through input devices 1340. A monitor or other type of device can also be connected to the system bus 1322 via an interface, such as an output interface 1350. In addition to a monitor, computers may also include other peripheral output devices. The computer 1310 may operate in a networked or distributed environment using logical connections to one or more other remote computers or databases. In addition, Remote devices 1370 may communicate with the computer 1310 through certain network interfaces 1360. The logical connections may include a network, such as a local area network (LAN) or a wide area network (WAN), but may also include other networks/buses.

It should be noted as well that certain embodiments may be implemented as a system, method or computer program product. Accordingly, aspects of the invention may take the form of an entirely hardware embodiment, an entirely software embodiment (including firmware, resident software, micro-code, et cetera) or an embodiment combining software and hardware aspects that may all generally be referred to herein as a "circuit," "module" or "system." In addition, circuits, modules, and systems may be "adapted" or "configured" to perform a specific set of tasks. Such adaptation or configuration may be purely hardware, through software, or a combination of both. Furthermore, aspects of the invention may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations for aspects of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatuses (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A system for generating a business process model from a project management application representation comprising:
   at least one processor;
   a system memory operatively coupled to the at least one processor, the system memory to store program instructions accessible to the at least one processor; and
   wherein, responsive to execution of the program instructions accessible to the at least one processor, the at least one processor is configured to:
   receive at least one portion of a project management application representation, wherein the at least one portion of a project management application representation comprises a plurality of sub-processes, wherein each sub-process comprises a task containing a plurality of activities;

wherein the plurality of sub-processes comprises at least one Siblings with No Dependency sub-process comprising at least two activities having a common parent ans wherein the at least two activities have no dependent activities, at least one Siblings with Dependencies sub-process comprising at least two activities haying a common parent and wherein at least one of the two activities has a dependent activity, at least one Cross Generations sub-process comprising at least one activity comprising at least one successor activity and wherein the at least one successor activity has a dependent activity, and at least one Cross Families sub-process comprising at least one activity comprising at least two dependent activities, wherein one of the at least two dependent activities is a predecessor of another of the at least two dependent activities, and wherein the at least two dependent activities each have at least one dependent activity;

apply at least one Siblings with No Dependencies transformation pattern, at least one Siblings with Dependencies transformation pattern, at least one Cross Generations transformation pattern, and at least one Cross Families transformation pattern to the at least a portion of the project management application representation, wherein the applying comprises applying at least one transformation pattern to each of the plurality of sub-processes;

wherein a Siblings with No Dependencies transformation pattern comprises transforming the at least one Siblings with No Dependency sub-process into: one fork node comprising the common parent, at least two parallel activity nodes each activity node comprising one of the at least two activities, and one merge node;

wherein a Siblings with Dependencies transformation pattern comprises transforming the at least one Siblings with Dependencies sub-process into: one fork node comprising the common parent, at least two parallel activity nodes each activity node comprising one of the at least two activities, an activity node comprising the dependent activity wherein an input of the activity node comprising the dependent activity is connected to an output of the activity node comprising the activity having the dependent activity, and one merge node;

wherein a Cross Generations transformation pattern comprises transforming the at least one Cross Generations sub-process, into: an activity node comprising the at least one activity and an activity node comprising the dependent activity, wherein an input of the activity node comprising the dependent activity is connected to an output of the activity node comprising the at least one activity; and wherein a Cross Families transformation pattern comprises transforming the at least one Cross Families sub-process into: an activity node comprising the dependent activity of the predecessor dependent activity and an activity node comprising the dependent activity of the successor dependent activity, wherein an input of the activity node comprising the dependent activity of the successor dependent activity is connected to an output of the activity node comprising the dependent activity of the predecessor dependent activity; and generate at least one flat business process model, wherein the flat business process model comprises the sub-processes transformed via the applied transformation pattern, wherein the flat business process model is not a hierarchical model.

2. The system according to claim 1, wherein the at least one project management application representation comprises at least one project plan.

3. The system according to claim 2, wherein the at least one project plan is comprised of at least one task, the at least one task being configured to link with any other task through a dependency.

4. The system according to claim 3, wherein the at least one business process model is represented in Business Process Modeling Notation.

5. The system according to claim 4, wherein the at least one business process model is generated through at least one flat transformation.

6. The system according to claim 5, wherein the at least one project plan comprises at least one task, at least one resource, at least one cost, and at least one schedule and wherein each task, resource, cost, and schedule of the at least one project plan is transformed recursively into a corresponding activity, resource, cost, and timeline of the at least one business process model.

7. A method for generating a business process model from a project management application representation comprising:

receiving at least one portion of a project management application representation, wherein the at least one portion of a project management application representation comprises a plurality of sub-processes, wherein each sub-process comprises a task containing a plurality of activities;

wherein the plurality of sub-processes comprises at least one Siblings with No Dependency sub-process comprising at least two activities having a common parent ans wherein the at least two activities have no dependent activities, at least one Siblings with Dependencies sub-process comprising at least two activities having a common parent and wherein at least one of the two activities has a dependent activity, at least one Cross Generations sub-process comprising at least one activity comprising at least one successor activity and wherein the at least one successor activity has a dependent activity, and at least one Cross Families sub-process comprising at least one activity comprising at least two dependent activities, wherein one of the at least two dependent activities is a predecessor of another of the at least two dependent activities, and wherein the at least two dependent activities each have at least one dependent activity;

applying at least one Siblings with No Dependencies transformation pattern, at least one Siblings with Dependencies transformation pattern, at least one Cross Generations transformation pattern, and at least one Cross Families transformation pattern to the at least a portion of the project management application representation, wherein the applying comprises applying at least one transformation pattern to each of the plurality of sub-processes;

wherein a Siblings with No Dependencies transformation pattern comprises transforming the at least one Siblings with No Dependency sub-process into: one fork node comprising the common parent, at least two parallel activity nodes each activity node comprising one of the at least two activities, and one merge node;

wherein a Siblings with Dependencies transformation pattern comprises transforming the at least one Siblings with Dependencies sub-process into: one fork node comprising the common parent, at least two parallel activity nodes each activity node comprising one of the at least two activities, an activity node comprising the dependent activity wherein an input of the activity node comprising the dependent activity is connected to an output of the activity node comprising the activity having the dependent activity, and one merge node;

wherein a Cross Generations transformation pattern comprises transforming the at least one Cross Generations sub-process, into: an activity node comprising the at least one activity and an activity node comprising the dependent activity, wherein an input of the activity node comprising the dependent activity is connected to an output of the activity node comprising the at least one activity; and wherein a Cross Families transformation pattern comprises transforming the at least one Cross Families sub-process into: an activity node comprising the dependent activity of the predecessor dependent activity and an activity node comprising the dependent activity of the successor dependent activity, wherein an input of the activity node comprising the dependent activity of the successor dependent activity is connected to an output of the activity node comprising the dependent activity of the predecessor dependent activity; and generating at least one flat business process model, wherein the flat business process model comprises the sub-processes transformed via the applied transformation pattern, wherein the flat business process model is not a hierarchical model.

8. The method according to claim 7, wherein the at least one portion of a project management application representation comprises at least one project plan.

9. The method according to claim 8, wherein the at least one project plan is comprised of at least one task, the at least one task being configured to link with any other task through a dependency.

10. The method according to claim 9, wherein the at least one business process model is represented in Business Process Modeling Notation.

11. The method according to claim 10, wherein the at least one business process model is generated through at least one flat transformation.

12. The method according to claim 11, wherein the at least one project plan comprises at least one task, at least one resource, at least one cost, and at least one schedule and wherein each task, resource, cost, and schedule of the at least one project plan is transformed recursively into a corresponding activity, resource, cost, and timeline of the at least one business process model.

13. A computer program product for generating a business process model from a project management application representation comprising:

a non-transitory computer readable storage medium having computer readable program code embodied therewith, the computer readable program code comprising:

computer readable program code configured to receive at least one portion of a project management application representation, wherein the at least one portion of a project management application representation comprises a plurality of sub-processes, wherein each sub-process comprises a task containing a plurality of activities;

wherein the plurality of sub-processes comprises at least one Siblings with No Dependency sub-process comprising at least two activities having a common parent ans wherein the at least two activities have no dependent activities, at least one Siblings with Dependencies sub-process comprising at least two activities having a common parent and wherein at least one of the two activities has a dependent activity, at least one Cross Generations sub-process comprising at least one activity comprising at least one successor activity and wherein the at least one successor activity has a dependent activity, and at least one Cross Families sub-process comprising at least one activity comprising at least two dependent activities, wherein one of the at least two dependent activities is a predecessor of another of the at least two dependent activities, and wherein the at least two dependent activities each have at least one dependent activity;

computer readable program code configured to apply at least one Siblings with No Dependencies transformation pattern, at least one Siblings with Dependencies transformation pattern, at least one Cross Generations transformation pattern, and at least one Cross Families transformation pattern to the at least a portion of the project management application representation, wherein the applying comprises applying at least one transformation pattern to each of the plurality of sub-processes;

wherein a Siblings with No Dependencies transformation pattern comprises transforming the at least one Siblings with No Dependency sub-process into: one fork node comprising the common parent, at least two parallel activity nodes each activity node comprising one of the at least two activities, and one merge node;

wherein a Siblings with Dependencies transformation pattern comprises transforming the at least one Siblings with Dependencies sub-process into: one fork node comprising the common parent, at least two parallel activity nodes each activity node comprising one of the at least two activities, an activity node comprising the dependent activity wherein an input of the activity node comprising the dependent activity is connected to an output of the activity node comprising the activity having the dependent activity, and one merge node;

wherein a Cross Generations transformation pattern comprises transforming the at least one Cross Generations sub-process, into: an activity node comprising the at least one activity and an activity node comprising the dependent activity, wherein an input of the activity node comprising the dependent activity is connected to an output of the activity node comprising the at least one activity; and wherein a Cross Families transformation pattern comprises transforming the at least one Cross Families sub-process into: an activity node comprising the dependent activity of the predecessor dependent activity and an activity node comprising the dependent activity of the successor dependent activity, wherein an input of the activity node comprising the dependent activity of the successor dependent activity is connected to an output of the activity node comprising the dependent activity of the predecessor dependent activity; and computer readable program code configured to generate at least one flat business process model, wherein the at least one flat business process model comprises the sub-processes transformed via the applied transformation pattern, wherein the flat business process model is not a hierarchical model.

* * * * *